United States Patent Office 2,768,204

Patented Oct. 23, 1956

1

2,768,204

GUANYLCHLOROFORMAMIDINE HYDROCHLORIDES

Ingenuin Hechenbleikner, Adams, Mass., assignor to American Cyanamid Company, New York, N. Y., a corporation of Maine No Drawing. Application February 27, 1956, Serial No. 567,738

6 Claims. (Cl. 260—565)

The present invention relates to new and useful substituted guanylchloroformamidines. In general these compounds are prepared as hydrohalides, usually the hydrochlorides, and are capable of representation by the generic formula

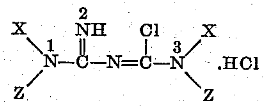

wherein X is an alkyl radical containing from one to eighteen carbon atoms or a phenyl radical, and Z is hydrogen or an alkyl radical containing from one to eighteen carbon atoms. As such it constitutes a continuation-in-part of my copending application for U. S. Letters Patent, Serial No. 358,549, filed May 29, 1953, now abandoned.

For purposes of nomenclature, the compounds herein described are regarded as derivatives of guanylchloroformamidine whose numbering is indicated in the above structural formula. Typical illustrative compounds include, for example:

1,3-di-t-butylguanylchloroformamidine hydrochloride
1,3-di-n-hexylguanylchloroformamidine hydrochloride
1,3-didecylguanylchloroformamidine hydrochloride
1,3-dioctadecylguanylchloroformamidine hydrochloride
1,3-diphenylguanylchloroformamidine hydrochloride
1,3-di-p-tolylguanylchloroformamidine hydrochloride
1,1,3,3-tetramethylguanylchloroformamidine hydrochloride
1,1,3,3-tetradecylguanylchloroformamidine hydrochloride
1,3-dimethyl-1,3-diphenylguanylchloroformamidine hydrochloride
1,3-di-n-propyl-1,3-diphenylguanylchloroformamidine hydrochloride The guanylchloroformamidine hydrochlorides of the present invention may be readily prepared by several methods utilizing suitable starting materials. One such intermediate is a substituted cyanamide dihydrochloride, for example, diethylcyanamide dihydrochloride, which is formed when 1 mole equivalent of the substituted cyanamide and 2 mole equivalents of hydrogen chloride are brought together at low temperatures, for example from 0° to 15° C.

In accordance with the present invention, the substituted guanylchloroformamidine hydrochlorides may be readily prepared by heating a substituted cyanamide dihydrochloride above its melting point, and usually at a temperature within the range of from about 120° to 160° C.

The compounds of the present invention may also be prepared by reacting together a substituted cyanamide and one mole equivalent of the substituted cyanamide dihydrochloride at a temperature usually within the range of from about 40° to 140° C.

Another simple and convenient method of preparing the substituted guanylchloroformamidine hydrochlorides of this invention consists in bringing together the substituted cyanamide and hydrogen chloride in equimolecular proportions at a temperature within the range of from about 30° C. to 180° C., and preferably within the range of from 60° to 150° C. Obviously, this method eliminates the step of forming the substituted cyanamide dihydrochloride intermediate.

In the latter two methods described above the reaction is somewhat exothermic, particularly in the early stages, and suitable control may be obtained by operating in the presence of an inert solvent or diluent. Compounds suitable for this purpose are acetonitrile, benzene, toluene, chlorobenzene, chloroform, dioxane, tetrahydrofurane, and the dimethyl ether of ethylene glycol.

The invention is further illustrated, but not limited, by the following examples:

EXAMPLE 1

*1,1,3,3-tetramethylguanylchloroformamidine hydrochloride*

A mixture consisting of 70 g. (1 mole) of dimethylcyanamide and 143 g. (1 mole) of dimethylcyanamide dihydrochloride, M. P. 127–129° C., was stirred and heated slowly to 140° C. for one hour. It gradually became a solid, crystalline mass, and was recrystallized from acetonitrile. 190 g. (90% yield) of the colorless crystalline product was obtained which melted at 233°–235° C.

EXAMPLE 2

*1,1,3,3-tetramethylguanylchloroformamidine hydrochloride*

Fifty grams of dimethylcyanamide dihydrochloride, M. P. 127–129° C., was heated at 160° C. for one hour. The residue was recrystallized from acetonitrile. 20 g. of the colorless crystalline product was obtained which melted at 230–235° C.

EXAMPLE 3

*1,1,3,3-tetraethylguanylchloroformamidine hydrochloride*

Ninety grams of hydrogen chloride was passed into 196 g. of diethylcyanamide during a period of one hour. The diethylcyanamide was stirred rapidly during the addition of the hydrogen chloride gas, and the temperature rose gradually to 85° C. The mixture was then heated for thirty minutes and the temperature was maintained at about 150° C. The product was a colorless crystalline solid which melted at 35–40° C.

EXAMPLE 4

*1,3-di-t-butylguanylchloroformamidine hydrochloride*

A mixture consisting of 98 g. of mono-t-butylcyanamide, 171 g. of mono-t-butylcyanamide dihydrochloride and 200 cc. of benzene was stirred and heated under reflux for a period of ninety minutes, then cooled to room temperature and filtered. 268 g. of the colorless crystalline product was obtained which melted at 150–155° C. with decomposition.

EXAMPLE 5

*1,3-di-t-octylguanylchloroformamidine hydrochloride*

134 g. of mono-t-octylcyanamide was dissolved in 200 cc. of benzene, and then treated with 36.5 g. of gaseous hydrogen chloride. The mixutre was heated under reflux for one hour, then cooled to room temperature and filtered. The product was a low-melting waxy solid.

EXAMPLE 6

*1,1,3,3-tetra-n-octylguanylchloroformamidine hydrochloride*

266 g. of di-n-octylcyanamide in 300 cc. of benzene was treated with 36.5 g. of gaseous hydrogen chloride at 25–30° C. The clear solution was heated under reflux for a period of ninety minutes. The benzene was removed by distillation, leaving 301 g. of the product, a pale-yellow oily liquid.

EXAMPLE 7

*1,1,3,3-tetralaurylguanylchloroformamidine hydrochloride*

The procedure of Example 6 was employed using 378 g. of dilaurylcyanamide and 36.5 g. of hydrogen chloride. 406 g. of the product, a clear oily liquid, was obtained.

EXAMPLE 8

*1,1,3,3-tetrabenzylguanylchloroformamidine hydrochloride*

A mixture consisting of 222 g. of dibenzylcyanamide, 297 g. of dibenzylcyanamide dihydrochloride and 300 cc. of benzene was stirred and heated under reflux for a period of two hours, then cooled to room temperature and filtered. 500 g. of the colorless crystalline product was obtained which melted at 225–227° C.

EXAMPLE 9

*1,3-dimethyl-1,3-diphenylguanylchloroformamidine hydrochloride*

132 g. of methylphenylcyanamide was dissolved in 300 cc. of acetonitrile, and then treated with 36.5 g. of gaseous hydrogen chloride at 20–25° C. The mixture was heated under reflux for two hours, cooled to room temperature and filtered. 160 g. of the colorless crystalline product was obtained which melted at 178–180° C.

The following examples illustrate the use of the compounds of the present invention as intermediates in the production of substituted biguanides, the latter being prepared by reacting the guanylchloroformamidine hydrochloride with a member of the group consisting of ammonia, a primary amine and a secondary amine in an inert solvent at a temperature within the range of from 10° C. to 90° C.

EXAMPLE 10

*1,1,5,5-tetraethylbiguanide*

A solution of 13.4 g. of tetraethylguanylchloroformamidine hydrochloride in 50 cc. of methanol was added to 25 cc. of 28.6% aqueous ammonia at 5° C. The temperature of the mixture rose quickly to 40° C. After standing at room temperature for one hour, the reaction mixture was poured into 200 cc. of water, and then made alkaline by the addition of sodium hydroxide. The precipitated biguanide was separated by filtration and recrystallized from hexane. The white crystalline product melted at 79–80° C.

EXAMPLE 11

*1,5-di-t-butyl-4-amylbiguanide*

10 g. of 1,3-di-t-butylguanylchloroformamidine hydrochloride was added slowly with stirring to a solution of 10 g. of n-amylamine in 20 cc. of acetonitrile maintained at about 5° C. After standing at room temperature for two hours, the reaction mixture was poured into 100 cc. of water and filtered to recover the precipitated 1,5-di-t-butyl-4-amylbiguanide hydrochloride. After recrystallization from ethanol the hydrochloride salt melted at 245–246° C. The free base was formed by treating the hydrochloride salt with potassium hydroxide in aqueous solution.

EXAMPLE 12

*1,1,4,4,5,5-hexamethylbiguanide*

213 g. of tetramethylguanylchloroformamidine hydrochloride was added slowly with stirring to 250 g. of a 40% aqueous solution of dimethylamine. The temperature of the mixture rose rapidly to about 40° C. After standing for 15 minutes, solid sodium hydroxide was added and the liquid separated into two phases. The organic phase was separated, dried over solid sodium hydroxide, and distilled under reduced pressure. The product, a colorless liquid, distilled at 115–117° C./1.0 mm.

EXAMPLE 13

*1,1,5,5-tetramethyl-4-phenylbiguanide*

A mixture of 21.3 g. (0.1 mol) of tetramethylguanylchloroformamidine hydrochloride, 18.6 g. (0.2 mol) of aniline and 100 cc. of acetonitrile was heated for 10 minutes at reflux. The clear solution upon cooling to room temperature deposited 32 g. of solid material which was dissolved in 100 cc. of water and made basic with ammonia. The aniline which separated was extracted with benzene and the aqueous layer was made alkaline by the addition of sodium hydroxide. The precipitated biguanide (20 g.) was separated by filtration and recrystallized from cyclohexane. The white crystalline product melted at 89–90° C.

The biguanides prepared from the guanylchloroformamidine hydrochlorides of the present invention are useful as tarnish inhibitors in detergent compositions utilized in the washing of household utensils such as tableware or "silverware" consisting of German silver and like alloys. The quantity of the tarnish inhibitor to be used is generally less than 1% by weight of the detergent composition, and preferably from 0.05% to 0.5%. The biguanides of Examples 10, 11, 12, and 13 were tested as tarnish inhibitors by the following method: alloy bars (65% copper, 18% nickel, 17% zinc) ⅛" x ½" x 2½" in size were cleaned with approximately 0.7 N nitric acid, rinsed with water and then acetone. A commercial detergent composition consisting of approximately 50% sodium tripolyphosphate, 25–30% alkyl-aryl sulfonate, 12–19% sodium sulfate and 3–4% sodium silicate was employed. The alloy bar was immersed in 25 cc. of detergent solution (2.5 g. of detergent per 1500 cc. of water) containing 0.4% of the biguanide compound (based on the weight of the detergent). The temperature of the detergent solution was maintained at 43° C. and the period of immersion was 7 minutes. The bar was removed from the solution, rinsed with water and acetone, and stored under toluene for observation of tarnish film. A blank test with the detergent solution gave a heavy tarnish film on the alloy bar, whereas tarnishing was substantially diminished with the detergent solutions containing the biguanide compounds.

The above described method of preparing the substituted biguanides forms the subject matter of my copending application with D. W. Kaiser for United States Letters Patent, Serial No. 535,509, filed September 20, 1955.

While the invention has been described with particular reference to specific embodiments, it is to be understood that it is not to be limited thereto but is to be construed broadly and restricted solely by the scope of the appended claims.

I claim:

1. A guanylchloroformamidine hydrochloride of the formula

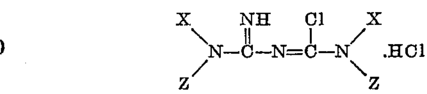

wherein X is a member of the group consisting of alkyl radicals containing from one to eighteen carbon atoms and a phenyl radical, and Z is a member of the group consisting of hydrogen and alkyl radicals containing from one to eighteen carbon atoms.

2. 1,1,3,3-tetramethylguanylchloroformamidine hydrochloride.

3. 1,3-di-t-butylguanylchloroformamidine hydrochloride.

4. 1,3-di-t-octylguanylchloroformamidine hydrochloride.

5. 1,1,3,3-tetralaurylguanylchloroformamidine hydrochloride.

6. 1,3 - dimethyl-1,3-diphenylguanylchloroformamidine hydrochloride.

References Cited in the file of this patent

UNITED STATES PATENTS

| | | |
|---|---|---|
| 2,704,297 | Hechenbleikner | Mar. 15, 1955 |
| 2,719,174 | Hechenbleikner | Sept. 27, 1955 |